United States Patent [19]

Katayama

[11] Patent Number: 5,563,694
[45] Date of Patent: Oct. 8, 1996

[54] PRINTER APPARATUS FOR FORMING AN EMBOSSED IMAGE

[75] Inventor: Hirohiko Katayama, Cupertino, Calif.

[73] Assignee: Canon Kabushiki Kaisha, Tokyo, Japan

[21] Appl. No.: 391,081

[22] Filed: Feb. 21, 1995

Related U.S. Application Data

[63] Continuation of Ser. No. 5,063, Jan. 15, 1993, abandoned.

[51] Int. Cl.$^6$ ................................................. G03G 15/20
[52] U.S. Cl. ............................................. 355/282; 430/126
[58] Field of Search ............................... 355/285, 290, 355/295, 282; 430/109, 110, 106.6, 112, 137; 219/216

[56] References Cited

U.S. PATENT DOCUMENTS

| | | | |
|---|---|---|---|
| 4,111,823 | 9/1978 | Kobayashi et al. | 428/403 X |
| 4,233,388 | 11/1980 | Bergen et al. | 430/137 |
| 4,367,276 | 1/1983 | Cooper et al. | 430/126 |
| 4,489,150 | 12/1984 | Chang et al. | 430/106 |
| 4,908,669 | 3/1990 | Yamamoto | 355/282 |
| 4,949,096 | 8/1990 | Ogawa et al. | 355/285 X |
| 4,980,257 | 12/1990 | Anno et al. | 430/110 |
| 5,045,888 | 9/1991 | Imaeda | 355/282 |
| 5,099,288 | 3/1992 | Britto et al. | 355/290 |
| 5,100,471 | 3/1992 | Winnik et al. | 106/23 |

*Primary Examiner*—Thu Anh Dang
*Attorney, Agent, or Firm*—Fitzpatrick, Cella, Harper & Scinto

[57] ABSTRACT

An apparatus performs emboss-printing. The apparatus forms an image on a print supporting member, such as a paper sheet, by using a powder printing member. The charge characteristics of the image and the print supporting member are different from each other. Because of the different charge characteristics of the two members, a thermoplastic developing agent is selectively attached to either the image portion or the non-image portion of the print supporting member. The attached thermoplastic developing agent is heat-melted to form an embossed image.

13 Claims, 6 Drawing Sheets

PRINTER APPARATUS FOR FORMING AN EMBOSSED IMAGE

This application is a continuation of application Ser. No. 08/005,063 filed Jan. 15, 1993, now abandoned.

BACKGROUND OF THE INVENTION

1. Field of the Invention

The present invention relates to a printer apparatus for forming a raised image, that is, a so-called embossed image, on a print supporting member, such as a paper sheet.

2. Description of the Related Art

Emboss printing is widely used to make printed matters impressive. For example, firm's names and trademarks are often embossed on business cards, letter papers and envelopes. Also, many invitation cards, Christmas cards, birthday cards or the like are embossed with greeting words and other decorative images.

Further, emboss printing is used to produce braille, embossed graphs or the like in publications for visually handicapped people to read by touching.

Various methods of forming embossed images have been invented and used.

Figure 8:
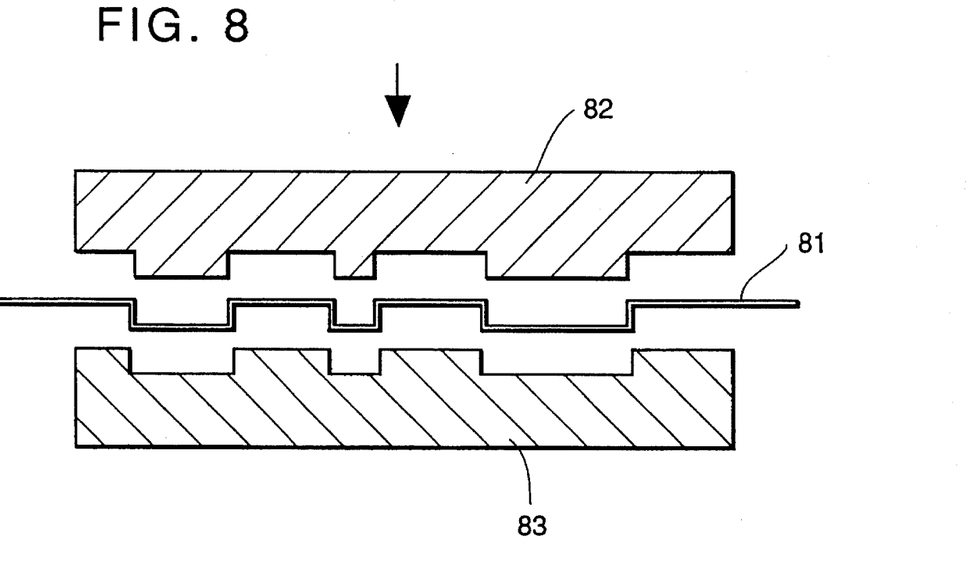
FIG. 8 schematically illustrates a conventional emboss-printing apparatus which forms an embossed image by pressing.

FIG. 8 shows a first method of forming an embossed image. In this method, a print supporting member 81, such as printing paper, is pressed between a male die 82 and a female die 83 which have a raised pattern and a recessed pattern, respectively, of characters, graphics, braille or the like. The print supporting member 81 is thus embossed with the characters, graphics, braille or the like.

Figure 9:
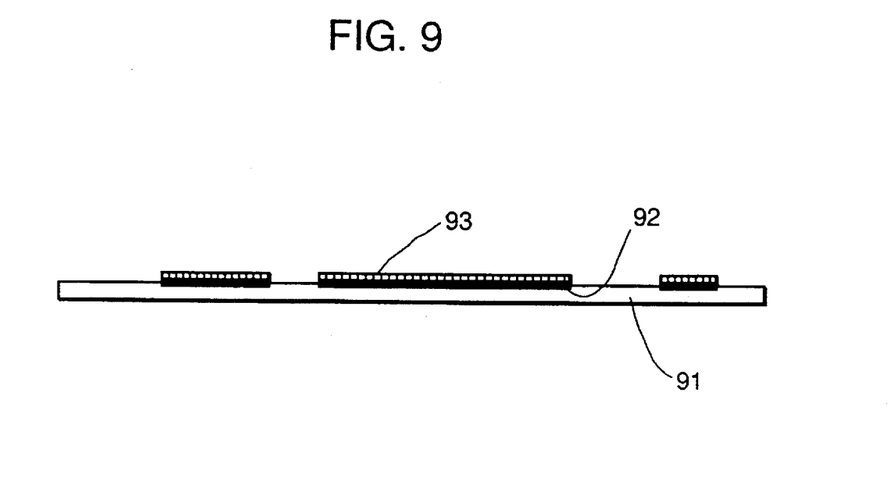
FIG. 9 is a sectional view of an embossed image formed by using a highly adhesive ink.

FIG. 9 shows a second method of forming an embossed image. In this method, characters, graphics, braille or the like are printed on a print supporting member 91, such as printing paper, in a highly-adhesive ink 92 by using an ordinary printer such as a screen printer or an offset printer, thus producing an initial image pattern. Then, thermoplastic resin powder 93 is dusted over the print supporting member 91. The thermoplastic resin powder 93 adheres to the initial image pattern formed of the highly-adhesive ink 92. After removing the thermoplastic resin powder 93 lying on portions other than the initial image pattern, heat is applied in order to dry the ink 92 and melt and completely fix the remaining thermoplastic resin powder 93, thus forming an embossed image of the characters, graphics, braille or the like.

Figure 10:
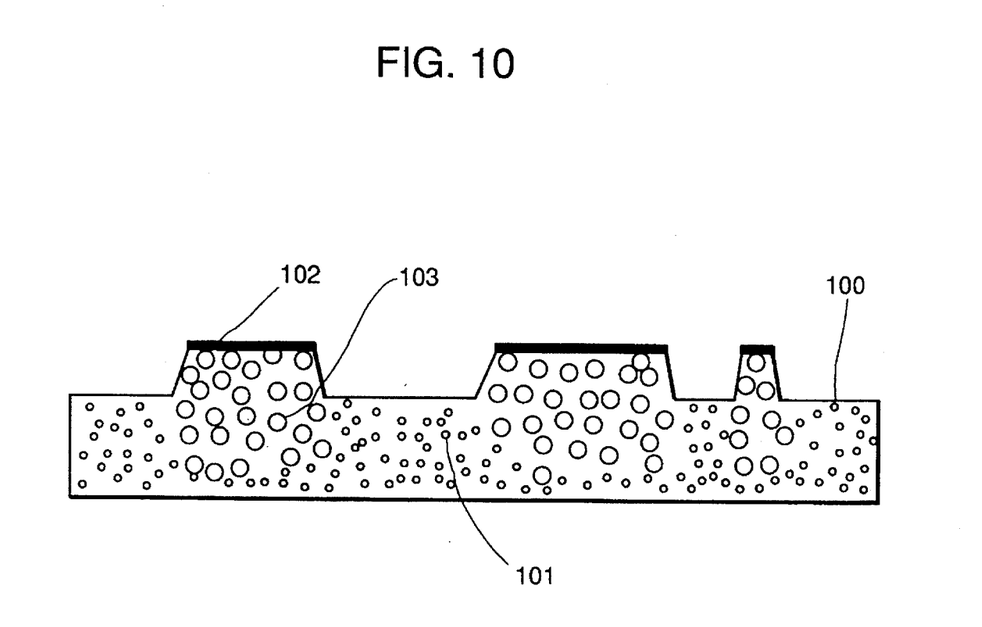
FIG. 10 is a sectional view of a foaming paper carrying embossed image.

FIG. 10 shows a third method of forming an embossed image. Using a copying machine or the like, an initial image pattern is formed of a highly heat-absorptive black toner 102 on a foamable paper sheet 100 which contains foamable micro-capsules 101. Then, the foamable paper sheet 100 carrying the initial image pattern is heated by using, e.g., infrared rays. As the temperature of the black toner 102 rises, the adjacent foamable micro-capsules 101 produce bubbles 103, thus expanding the toner-adjacent portions of the paper sheet 100 to form an embossed image.

Figure 11:
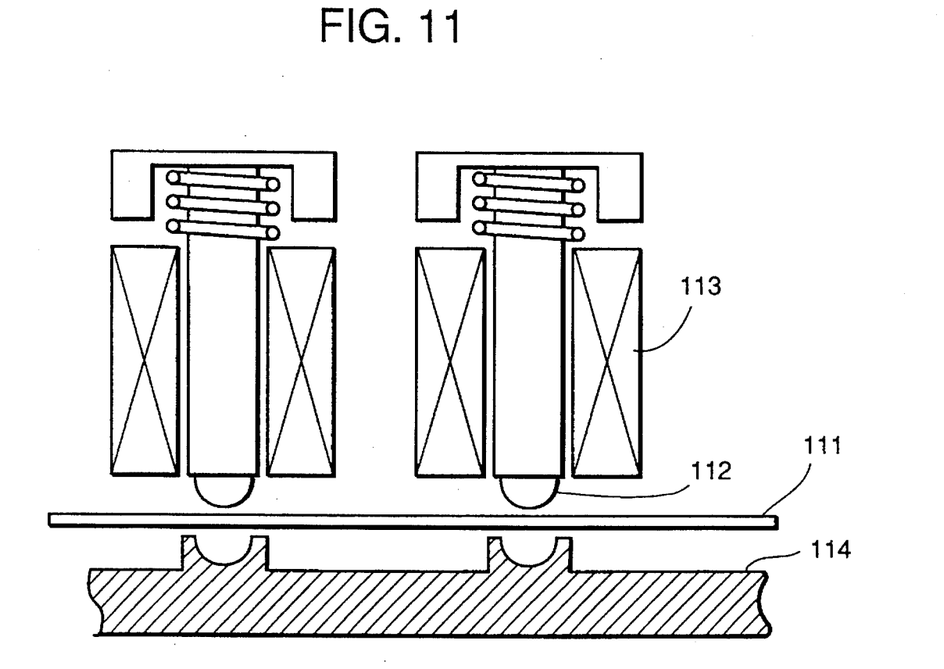
FIG. 11 schematically illustrates a braille printer.

FIG. 11 shows a fourth method of forming an embossed image, in which a braille embossing printer is used. As shown in the figure, printing paper 111 is placed between a metallic plate 114 having small hemispherical recesses and electromagnetic solenoids 113 having small circular metallic tips 112. By supplying current to the electromagnetic solenoids 113, the small circular metallic tips 112 are moved to strike the printing paper 111 against the small recesses of the metallic plate 114, thus embossing braille points.

The above-described known methods of forming embossed images have problems as follows.

Though the above-described first method is suitable to produce large amounts of high-quality emboss-printed items, it takes a very precise milling machine and a long processing time to precisely form the male and female press-dies, that is, printing original plates, respectively having the raised and recessed patterns of an image. Thus, the production cost of the press dies is substantially high. Further, because the press dies must be pressed onto the print supporting member by a great pressure, a large pressing machine is required. Since most large pressing machines produce great noises and vibrations, means for mitigating such noises and vibrations must be provided.

The above-described second method also has a problem in that formation of a printing original plate requires a substantially long time and high cost, though a printing original plate according to this method is easier to obtain than the printing original plates according to the first method. Further, this method needs a large printer for forming an initial image pattern on a print supporting member by using a printing original plate and a large apparatus for applying thermoplastic resin powder to a print supporting member and heating the print supporting member so as to melt the thermoplastic powder applied thereto. Because these apparatuses take up much space and produce loud noises, this method is not very suitable to perform in offices or homes. Still further, the thermoplastic resin powder mostly form monoparticle layers on the adhesive ink, as shown in FIG. 9, because the powder particles are fixed to the ink by the adhesiveness of the ink. Therefore, it is difficult to obtain a polyoparticle layer, which means that this method is unsuitable to form an embossed image having a great height.

The above-mentioned third method can be suitably performed in offices and homes because the printing apparatus used in this method is relatively small and quiet. However, because production of the foamable paper containing foamable microcapsules requires a specifically constructed apparatus, the production cost of the foamable paper is nearly three digits greater than the production cost of copying paper. Further, because the height of an embossed image achieved by formation of bubbles in the paper is at most half the thickness of the paper, the paper must be substantially thick in order to obtain a sufficiently high embossed image. Still further, because the images are embossed by bubbles formed in the paper, the embossed images fail to obtain a substantial strength to resist forces imposed on their top surfaces, thus causing problems in storability and durability.

In the above-described fourth method, a paper sheet is pressed between the small recesses of the metallic plate and the small circular metallic tips which are moved to strike the plate by the force created by the electromagnetic solenoids, as described above. Thus, embossed images are formed by stretching or breaking the fibers of the paper. Because it takes a great force to stretch or break the paper fibers, the electromagnetic solenoids must create great forces so that the metallic tips strike the paper sheet against the metallic plate sufficiently hard, thus causing noises having high-frequency components, which are typical of noises produced by metal impacting on metal. Therefore, though the braille embossing printer according to this method is relatively small, it is not very suitable to use in offices or homes.

Further, electric typewriters are widely used for emboss printing. One cycle of striking and returning of the electromagnetic solenoid of an electric typewriter produces either one character or one braille point. Therefore, it takes six or eight of such cycles to produce one braille character because one braille character is a combination of six or eight braille points. Further, a substantial distance must be provided between braille points because, otherwise, formation of one braille point would result in deformation of the adjacent braille points. Therefore, electric typewriters are not suitable for either high-speed emboss printing or formation of a continuously embossed line or a minute graphic.

There is a growing demand for an emboss printing apparatus which is able to perform high-speed emboss printing and produce emboss-printed items of many different types but not necessarily in large amounts and which is small and quiet and inexpensive to operate and, therefore, is suitable to use in offices and homes, just as is desired for an ordinary-type printing apparatus.

SUMMARY OF THE INVENTION

The present invention is intended to solve the problems of the known art.

An object of the present invention is to provide a small and quiet printer apparatus for forming an embossed image, the printer apparatus being able to emboss-print a complicated graphic without requiring a long time for preparation and to produce emboss-printed matter without increasing the cost.

To achieve the objects of the present invention, the present invention provides a printer apparatus for forming an embossed image, the printer apparatus comprising: initial image forming means for forming an image on a print supporting member by using a print member having a charge characteristic different from the charge characteristic of the print supporting member; charging means for charging the print supporting member carrying an image formed by the initial image forming means; developing means for electrostatically applying a thermoplastic developing agent to an image portion of the print supporting member or a non-image portion of the print supporting member; and fixing means for heat-melting the thermoplastic developing agent applied to the print supporting member so as to fix the thermoplastic developing agent to the print supporting member.

An apparatus thus constructed is able to form an embossed image by raising either the image portions carrying a printing member, such as a toner or a print ink, or the non-image portions carrying a non-printing member of an initial image which has been formed by a generally-used initial image forming means, such as an electrophotographic printer, laser beam printer or a simplified printer. The thus-formed embossed pattern accurately corresponds to the initial image. In other words, the embossed pattern retains substantially all the components and parts of the initial image pattern, regardless of the widths or continuity of lines.

The object of the present invention is also achieved by a printer apparatus for forming an embossed image, comprising initial image forming means comprising an electrophotographic photosensitive member, latent image forming means for forming an electrostatic latent image on the electrophotographic photosensitive member, first developing means for developing a latent image formed on the electrophotographic photosensitive member by using a powder printing member, a transferring member for transferring the powder printing member from the electrophotographic photosensitive member to a sheet-like print supporting member which has a charge characteristic different from the charge characteristic of the powder printing member; charging means for applying electric charges to the print supporting member carrying an image formed by the initial image forming means; second developing means for electrostatically applying a thermoplastic developing agent to an image portion of the print supporting member or a non-image portion of the print supporting member; and fixing means for heat-melting the thermoplastic developing agent applied to the print supporting member so as to fix the thermoplastic developing agent to the print supporting member.

Further objects, features and advantages of the present invention will become apparent from the following description of the invention with reference to the attached drawings.

DESCRIPTION OF THE INVENTION

The present invention will be described hereinafter with reference to Examples. FIGS. 1 to 6 illustrate the representative process of emboss-printing according to the present invention.

Example 1

Figure 1:
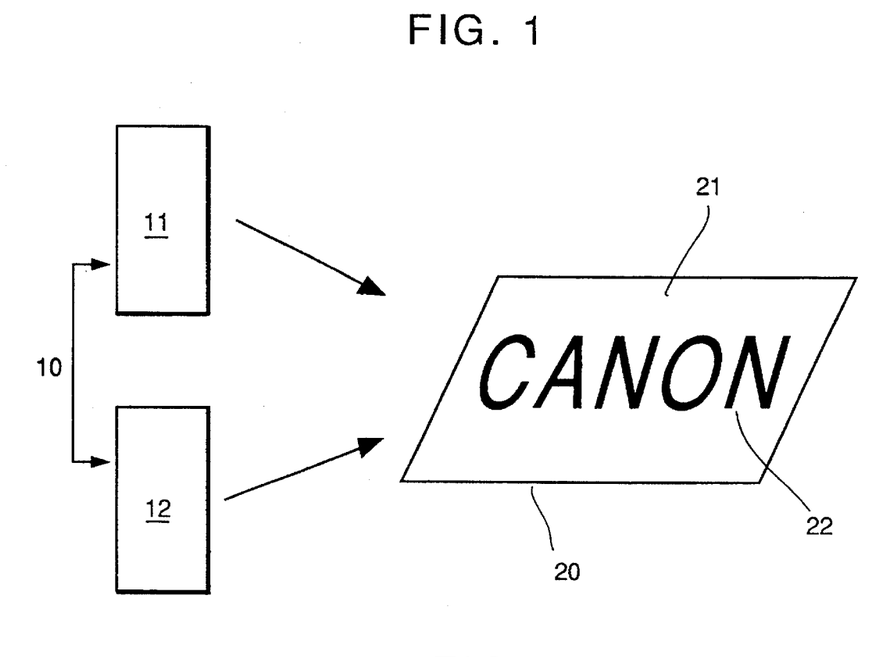
FIG. 1 illustrates an original image forming unit employed in a printer apparatus according to an embodiment of the present invention.
Figure 2:
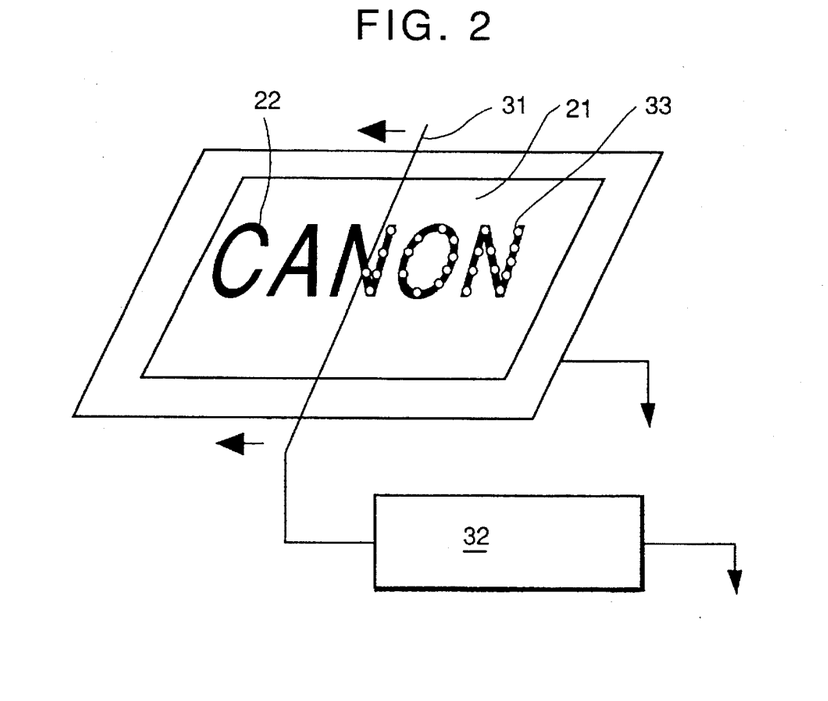
FIG. 2 is a schematic perspective view of a corona charging unit employed in the above-mentioned printer apparatus.
Figure 3:
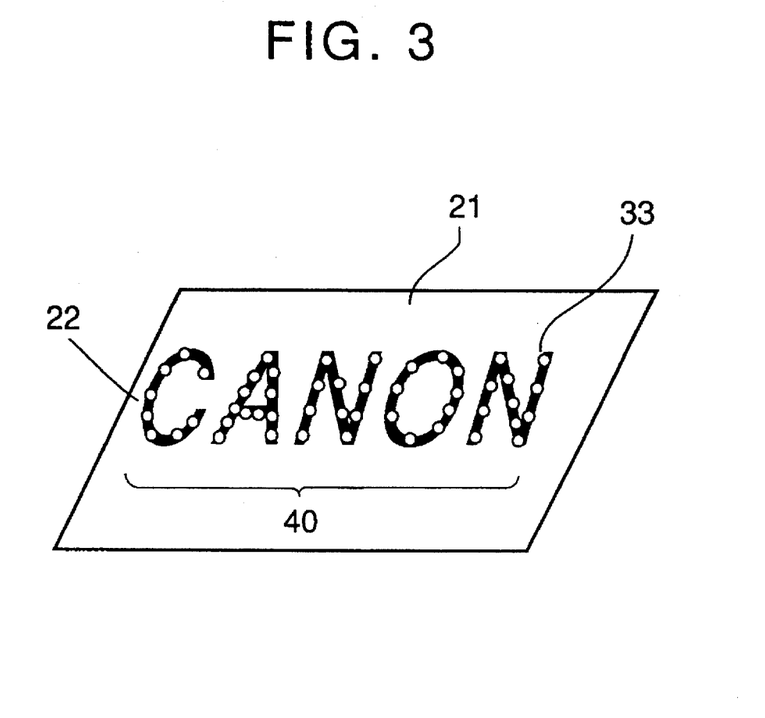
FIG. 3 illustrates an electrostatic latent image formed by the corona charging unit illustrated in FIG. 2.
Figure 4:
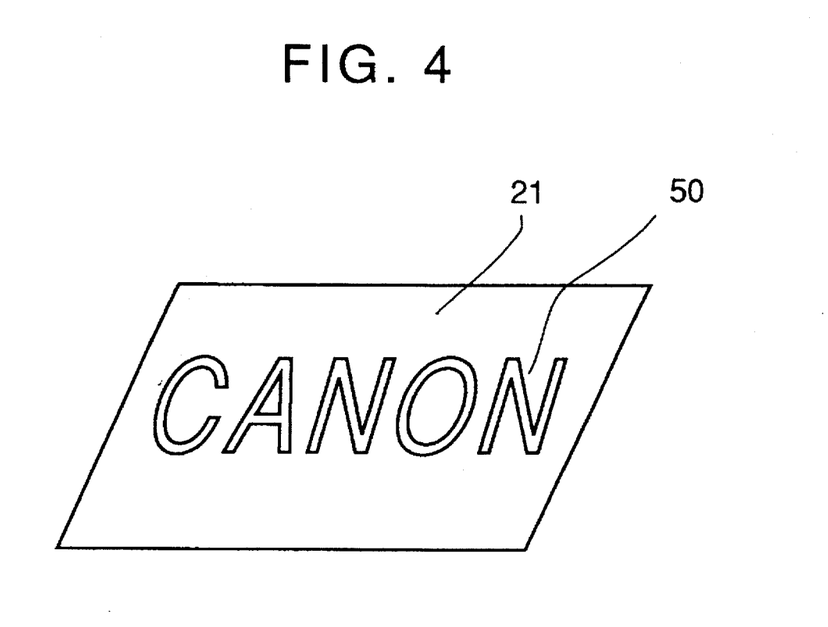
FIG. 4 illustrates an image formed by electrostatically applying a thermoplastic resin powder developing agent to the electrostatic latent image shown in FIG. 3.
Figure 5:
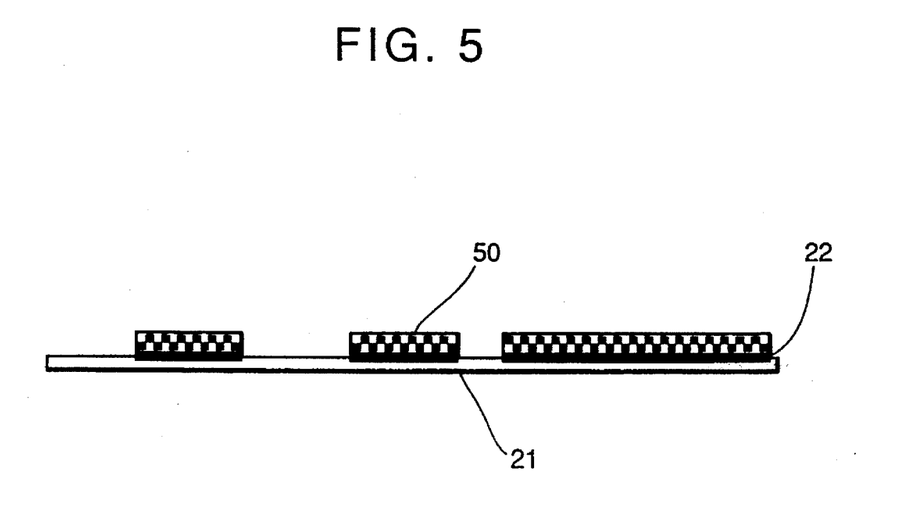
FIG. 5 is a sectional view of an image formed of the thermoplastic resin powder developing agent which is electrostatically attached to the electrostatic latent image.
Figure 6:
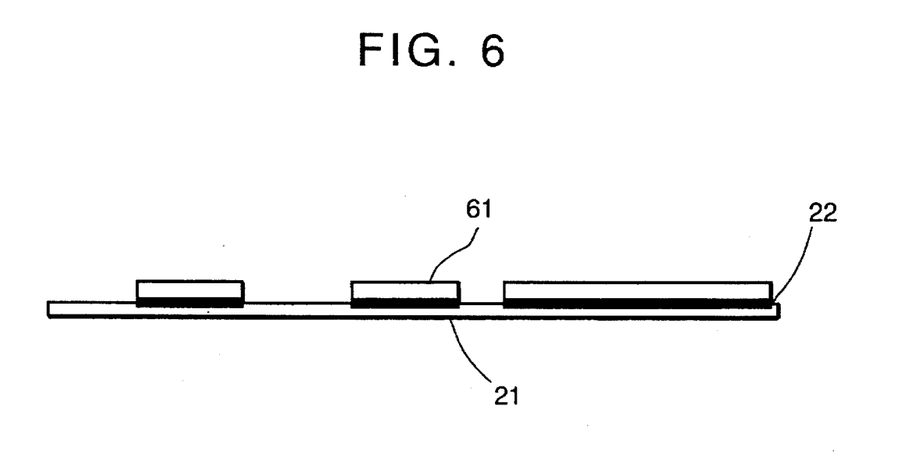
FIG. 6 is a sectional view of an embossed image formed by heat-melting the thermoplastic resin powder developer which is electrostatically attached to the electrostatic latent image.

Referring to FIG. 1, an electrophotographic printer 11 or a laser beam printer 12 was used as the initial image forming unit 10 in Example 1 to form an initial image on a paper sheet 11 (a print supporting member) by using a toner 22 containing a resin component, a coloring material component, a magnetic substance component, etc. An initial-image sheet 20 carrying the initial image was thus obtained. Then, as shown in FIG. 2, the initial-image sheet 20 was charged by a corona charging device composed of a corona charger 31 and a high voltage source 32 capable of generating high voltages in a range between 1 and 10 kV. By corona charging, electric charges 33 are stored in the toner portion 22 of the initial-image sheet, but almost no charges are stored in the non-toner portion carrying no toner. An electrostatic latent image was thus formed on the paper sheet 21, as illustrated in FIG. 3. As shown in FIG. 4, when a developing agent which is a thermoplastic resin powder, e.g., polyamide resin powder 50 having a particle size of 0.2 to 0.8 mm, is applied to the electrostatic latent image 40, the polyamide resin powder 50 sticks only to the latent image 40 by electrostatic attractive force. In this manner, an image formed of polyamide resin powder 50 was obtained. FIG. 5 shows a sectional view thereof. The thickness of the layer of the polyamide resin powder 50 is variable in a range between one particle and about 10 particles, depending on the amount of electric charges of the electrostatic latent image 40 and the particle size of the polyamide resin powder 50. Then, after removing the polyamide resin powder from the non-toner portion by using vacuum sucking means, the polyamide resin powder 50 was melted by heating to 160°–200° C. for 3 seconds by using an infrared heater. Thus, an embossed image having a uniform polyamide resin layer was formed on the paper sheet 21. FIG. 6 is a sectional view of the thus-formed embossed image, showing the paper sheet 21 (the print supporting member), the toner 22 constituting the initial image formed by the electrophotographic printer 11 and the uniform polyamide resin layer 61 formed by melting the layer of polyamide resin powder. The thickness of the polyamide resin layer 61 is determined by the thickness of the layer of polyamide resin powder. Therefore, the thickness varies depending on the corona charging voltage and the particle size of the polyamide resin powder. For example, if corona charging is performed under conditions that the corona charger 31 is 10 mm apart from an initial-image sheet 20 and that the charging voltage is 6 kV and if a polyamide powder having a particle size of about 0.6 mm is used, a polyamide resin layer having a thickness of 0.7 mm is formed.

Figure 12:
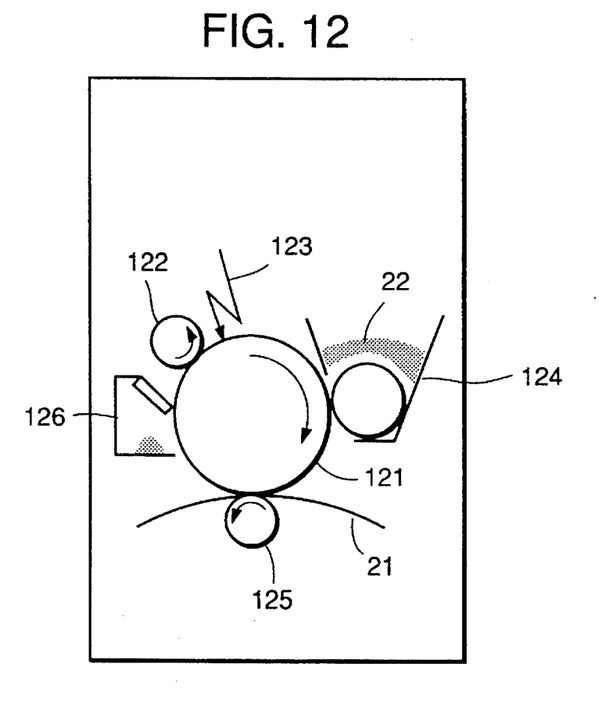
FIG. 12 illustrates an electrophotographic apparatus for forming an initial image on a print supporting member, that is, a paper sheet.

FIG. 12 illustrates an essential portion of the initial image forming unit, that is, either an electrophotographic printer 11 or a laser beam printer 12. The initial image forming unit comprises: an electrophotographic photosensitive drum 121 having OPC photosensitive layer; charging means 122 composed of an electrode roller which is provided near the circumferential surface of the electrophotographic photosensitive drum 121; light information 123 supplied from a document table or a digital light source; a developing device 124 having the above-mentioned toner 22; a paper sheet 21 on which an initial image is formed by transferring a toner image from the electrophotographic photosensitive drum 121 thereto; transferring means 125 composed of an electrode roller which presses the paper sheet 21 onto the photosensitive drum 121 and to which a bias voltage is applied for transfer; and cleaning means 126 for removing the residual toner from the photosensitive drum 121 after transfer. Further, in addition to the above laser beam printer, the present invention can also be applied to an electrophotographic apparatus which forms toner images by exposing the above photosensitive member to an original image.

Example 1 will be more specifically described.

In this example, an initial image 20 was formed at normal temperature and humidity. The toner comprising: a charge controlling agent; and a powder which has a particle size of 5 to 20 μm and which consists of a binding resin and magnetite, was used. This toner is of the type that is widely used in the known electrophotographic apparatuses. The paper sheet 21 (the print supporting member) was an ordinary paper sheet having a volume resistivity of $10^6$ to $10^8$ Ωcm at normal temperature and humidity.

In the same environments, the entire paper sheet 21 carrying the initial image was uniformly charged by the corona charger 31 to which a voltage of −5 kV was applied. Then, the polyamide resin powder having a particle size of 200 to 300 μm was dusted onto the charged paper sheet 21. Subsequently, the polyamide resin powder on the portion carrying no toner or almost no toner was removed by a vacuum sucking means. Instead of using a vacuum sucking means, a paper sheet 21 may be tilted or inverted to remove the polyamide resin powder.

The paper sheet 21 carrying the polyamide resin powder was heated to 180° C. for 3 seconds by the infrared heater. By this heat treatment, the polyamide resin powder was melted and fixed, thus forming an embossed image.

The charge polarity of a paper sheet 21 may optionally be determined by the combination of the charge characteristic of toner image and the charge characteristic of the paper sheet 21. There is no need to specify the charge polarity of either of the two members, as long as one of the two members is non-conductive and the other has a low electric resistance.

Example 2

Figure 7:
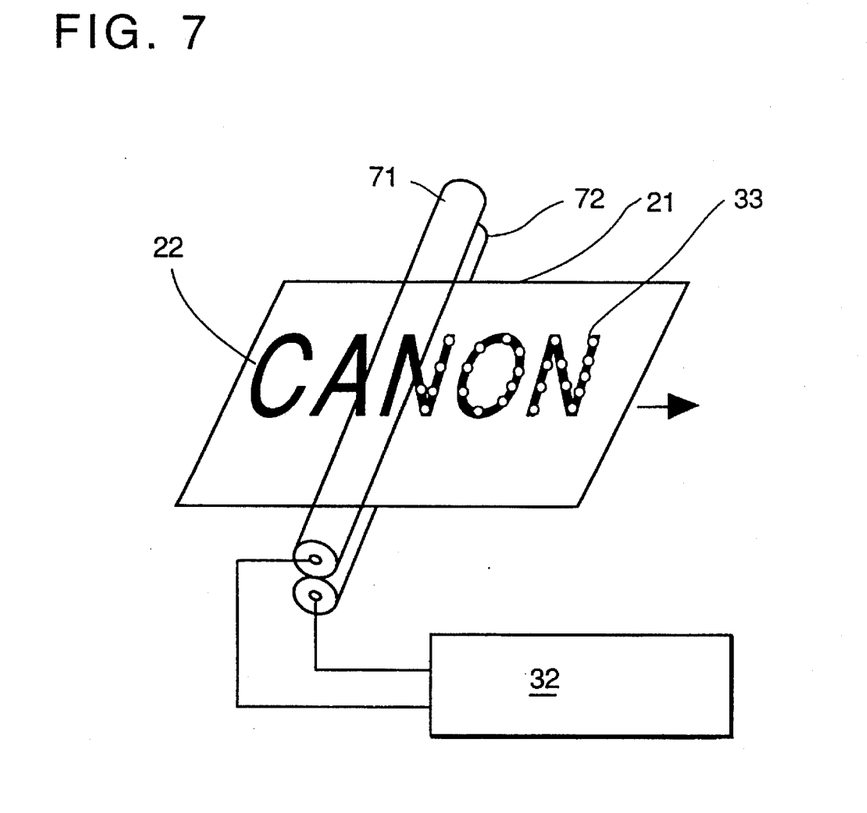
FIG. 7 is a schematic perspective view of charging means employing a roller charging unit.

Example 2 had substantially the same structure as Example 1, except that a charger as shown in FIG. 7 was used instead of the charger 31 used in Example 1. As shown in FIG. 7, the charger in this example is composed of a metallic roller 72 and a roller 71 made of an electroconductive rubber containing carbon. Each of the rollers 71 and 72 is connected to a high voltage source 32 and rotated at a constant speed. Thus, the rollers 71 and 72 charge an initial-image sheet 20, as well as convey the initial-image sheet 20. Because of this roller-type charger, Example 2 required a voltage of only 3 kV to form an electrostatic latent image which was comparable to the electrostatic latent image formed by Example 1. This required voltage of 3 kV is about half the voltage required to form an electrostatic latent image by Example 1. Substantially the same advantage was achieved by a charger having an electroconductive rubber plate instead of the electroconductive rubber roller 71. The charger of Example 2 reduced not only the required voltage but also the amount of ozone produced thereby, compared with the corona charger of Example 1.

Example 3

A color electrophotographic printer was used to form initial images on paper sheets by separately using red, blue and green toners. The initial-image sheets were processed in substantially the same manner as in Example 1, thus obtaining embossed images having polyamide resin layers on the red, blue and green toner portions.

The polyamide resin layers formed on the toner portions by melting the polyamide resin powder were colorless and transparent and caused no changes in the colors of the initial images. Therefore, the thus-embossed images achieved substantially the same visual effects as achieved by a printed item having a thick ink layer. Further, because the polyamide resin layers were substantially thick and portions thereof were directly and firmly attached to the paper sheets, they also served as protection layers of the toner portions.

Example 4

Embossed images were formed by substantially the same manner as in Example 1, except that a polyamide resin powder containing red ocher, that is, a red pigment, was used as the developing agent composed of a thermoplastic resin powder. During the heat treatment, the pigment dispersed homogeneously in the polyamide resin layer. Thus, embossed images having red polyamide layers were formed on paper sheets.

Partial emboss-printing and red-coloring was suitably performed either by selectively corona-charging a portion of the toner image on a paper sheet so that the thermoplastic resin powder developing agent was subsequently dusted and electrostatically attached thereto, or by selectively applying the thermoplastic resin powder developing agent to a portion of an entirely-charged toner image.

Example 5

An initial image was formed on a paper sheet by an ordinary electrophotographic printer using a black toner. The thus-obtained initial-image sheet was processed in substantially the same manner as in Example 1, in order to obtain an embossed image having polyamide resin layer on the black toner portion. In this example, the polyamide resin powder was not completely removed from the non-toner portions of the paper sheet, that is, the portion carrying no toner. The image sheet carrying the black toner and the polyamide resin powder was irradiated with infrared light emitted from a xenon flash lamp of 1 kW for 0.1 to 0.3 second. The black toner absorbed infrared light and, therefore, was heated so that the acrylamide resin powder on the black toner melted just as observed in Example 1. On the other hand, the polyamide resin powder on the non-toner portion did not melt because the non-toner portion absorbs less infrared light. Therefore, it was easy to subsequently remove the polyamide resin powder from the non-toner portion.

Example 6

This example used, as the thermoplastic resin powder developing agent, a mixture of 1 part of polyamide resin powder and 0.1 part of foaming micro-capsules obtained by enclosing gasifiable materials, such as propane, isobutane or pentane, in shells formed of polyacrylic ester or acrylic ester-acrylonitrile copolymer. When the polyamide resin powder was heated and melted, the shells of the foaming micro-capsules were broken, thus forming bubbles in the polyamide resin layer. The height of the thus-formed embossed image was 10–30 % greater than that of the embossed image formed by Example 1 which used a thermoplastic developing agent composed of only polyamide resin powder. Further, bubbles made the surface of the embossed image rough, adding a tactile effect.

Example 7

This example used, as the thermoplastic resin developing agent, a mixture of 1 part of polyamide resin powder having a particle size of about 0.2 mm and 3 parts of vinyl chloride resin powder having a particle size of 0.2 to 0.8 mm.

This mixed powder developing agent was electrostatically attached to the toner portion of an initial-image sheet in substantially the same manner as in Example 1. After removing the mixed powder developing agent from the non-toner portion of the initial-image sheet, the sheet was heated for about 3 seconds at 100° C. by an infrared heater. By this heat treatment, only the vinyl chloride resin powder was melted, forming an embossed image having a uniform vinyl chloride layer. Some particles of the polyamide resin powder which had not been melted by the heat treatment at 100° C. were dispersed on the surface of the vinyl chloride resin layer and scattered light, thus giving the embossed image a visual characteristic different from that of the embossed image formed by Example 1. Further, the polyamide resin powder which was dispersed on the surface of the embossed image made the surface somewhat rough, achieving an impression different from that of the embossed image formed by Example 1.

Example 8

An initial-image sheet was treated with halftone dots. The thus-obtained initial-image sheet was processed in substantially the same manner as in Example 1. As a result, even the polyamide resin layer formed on solid portions of the initial image retained the effects caused by the halftone dot treatment. Further, the polyamide resin layer was 10 to 30% thicker than the polyamide resin layer formed by Example 1, which did not perform halftone dot treatment. Thus, the visual tactile impressions were improved.

Other Examples

Instead of using an initial image formed by a printing apparatus, a manually drawn or painted initial image may be used to form an embossed image, achieving substantially the same effects as described above. Further, instead of using a toner, other printing members, such as printing ink containing a very small amount of metallic powder, may be used to form an initial image, achieving substantially the same effects as described above.

If a combination of the polarity for charging a printing member, such as a toner, and the polarity of thermoplastic resin powder developing agent is suitably selected, the thermoplastic resin powder can be electrostatically attached selectively to either a portion carrying a printing member or a portion carrying no printing member. Thus, either of the two different portions can be selectively embossed. This means that either a negative or a positive embossed image can be selectively formed from an initial image.

By varying the components of the thermoplastic resin powder developing agent and/or the contents thereof, the physical and/or chemical characteristics of the resin layer formed from the agent can be varied. Thus, embossed images having different visual and/or tactile characteristics can be obtained.

Because a printer apparatus according to the present invention mostly uses a thermoplastic resin powder to form an embossed image, the thus-formed embossed image obtains a substantially great strength against a force that acts on the top surface thereof and, further, obtains a substantially great chemical stability. Further, because the printer apparatus of the present invention can use, as print supporting members, paper sheets of an ordinary type which are widely used for copying, good storability is achieved.

Moreover, a printer apparatus for forming an embossed image according to the present invention operates in a simplified process and needs no movable parts or portions which require large forces to move, the present invention has potentials to achieve high-speed printing and reduce the size of the apparatus and the noise produced thereby. Further, because the apparatus consumes no expensive materials to perform emboss-printing, the cost of emboss-printed items can be reduced.

As described above, a novel printer apparatus for forming an embossed image according to the present invention substantially eliminates the problems of the conventional art.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and the scope of the appended claims. The scope of the following claims is to be accorded to the broadest interpretation so as to encompass all such modifications and equivalent structures and functions.

What is claimed is:

1. A printer apparatus for forming an embossed image, comprising:

initial image forming means for forming an initial image on a print supporting member by using a print member having a charge characteristic different from the charge characteristic of said print supporting member;

charging means for charging said print supporting member carrying an image formed by said initial image forming means;

developing means for electrostatically applying a thermoplastic developing agent to an image portion of said print supporting member or a non-image portion of said print supporting member to form a positive and/or negative embossed image, said developing agent being made foamable upon heating; and fixing means for heat-melting said thermoplastic developing agent applied to said print supporting member so as to fix said thermoplastic developing agent to said print supporting member, to form said embossed image.

2. A printer apparatus for forming an embossed image, comprising initial image forming means for forming an image on a print supporting member by using a print member having a charge characteristic different from the charge characteristic of said print supporting member;

charging means for charging said print supporting member carrying an image formed by said initial image forming means;

developing means for electrostatically applying a thermoplastic developing agent to an image portion of said print supporting member or a non-image portion of said print supporting member; and fixing means for heat-melting said thermoplastic developing agent applied to said print supporting member so as to fix said thermoplastic developing agent to said print supporting member said fixing means being an infrared pulse light source; and wherein said printing member absorbs the energy of infrared and generates heat in return.

3. A printer apparatus for forming an embossed image, according to claim 1, wherein said thermoplastic agent contains a coloring agent.

4. A printer apparatus for forming an embossed image, according to claim 1, wherein said thermoplastic developing agent contains a first thermoplastic powder agent and a second resin powder agent having a melting point higher than the melting point of said first thermoplastic powder agent, so that said second resin powder agent remains unmelted on the surface of an image after said thermoplastic developing agent is fixed by said fixing means.

5. A printer apparatus for forming an embossed image, according to claim 2, wherein said printing member absorbs the energy of infrared and generates heat in return so as to selectively heat and melt said thermoplastic developing agent electrostatically attached to said printing member, and removing means is provided for removing the thermoplastic developing agent which is left unmelted on the non-image portion.

6. A printer apparatus for forming an embossed image, according to claim 2, wherein said thermoplastic developing agent contains a foaming agent which foams when receiving heat.

7. A printer apparatus for forming an embossed image, comprising:

initial image forming means comprising an electrophotographic photosensitive member, latent image forming means for forming an electrostatic latent image on said electrophotographic photosensitive member, first developing means for developing a latent image formed on said electrophotographic photosensitive member by using a powder printing member, a transferring member for transferring said powder printing member for said electrophotographic photosensitive member to a sheet-like print supporting member which has a charge characteristic different from the charge characteristic of said powder printing member;

charging means for applying electric charges to said print supporting member carrying an image formed by said initial image forming means;

second developing means for electrostatically applying a thermoplastic developing agent to an image portion of said print supporting member or a non-image portion of said print supporting member, said thermoplastic developing agent being made foamable upon heating; and fixing means for heat-melting said thermoplastic developing agent applied to said print supporting member so as to fix said thermoplastic developing agent to said print supporting member.

8. A printer apparatus for forming an embossed image, according to claim 7, wherein said printing member absorbs the energy of infrared and generates heat in return.

9. A printer apparatus for forming an embossed image, according to claim 7, wherein said fixing means is an infrared pulse light source.

10. A printer apparatus for forming an embossed image, according to claim 7, wherein said printing member absorbs the energy of infrared and generates heat in return so as to selectively heat-melt said thermoplastic developing agent electrostatically attached to said printing member, and removing means is provided for removing the developing agent which is left unmelted on the non-image portion.

11. A printer apparatus for forming an embossed image, according to claim 7, wherein said thermoplastic developing agent contains a foaming agent which foams when receiving heat.

12. A printer apparatus for forming an embossed image, according to claim 7, wherein said thermoplastic developing agent contains a first thermoplastic powder agent and a second resin powder agent having a melting point higher than that of said first thermoplastic powder agent, so that said second resin powder agent remains unmelted on the surface of an image after said thermoplastic developing agent is fixed by said fixing means.

13. A printer apparatus for forming an embossed image, according to claim 7, wherein said thermoplastic agent contains a coloring agent.

* * * * *